March 9, 1926.

J. B. L. BROWN

BUMPER

Filed July 21, 1922

1,576,085

INVENTOR.
James B. L. Brown
BY
ATTORNEYS.

Patented Mar. 9, 1926.

1,576,085

UNITED STATES PATENT OFFICE.

JAMES B. L. BROWN, OF LOS ANGELES, CALIFORNIA.

BUMPER.

Application filed July 21, 1922. Serial No. 576,570.

*To all whom it may concern:*

Be it known that I, JAMES B. L. BROWN, a citizen of the United States, residing at Los Angeles, in the county of Los Angeles and State of California, have invented new and useful Improvements in Bumpers, of which the following is a specification.

My invention relates to spring bumpers, and particularly to automobile spring bumpers, and the main object of my invention is to provide an automobile bumper which may be made in one piece, or of a single bar of spring steel and secured directly to the end of the automobile chassis, thus eliminating the use of brackets or other parts which are necessary in mounting other bumpers on automobiles, and materially reducing the cost of bumpers.

The invention has for further objects the provision of an improved bumper which will be superior in point of relative simplicity and inexpensiveness, taken in conjunction with utility, durability and general efficiency and serviceability.

With the above and other objects in view, the invention consists in the novel and useful provision, formation, construction, combination, association and inter-relation of parts, members and features, all disclosed in the accompanying drawing, described in the following statement, and finally pointed out in the claim.

Figure 1:
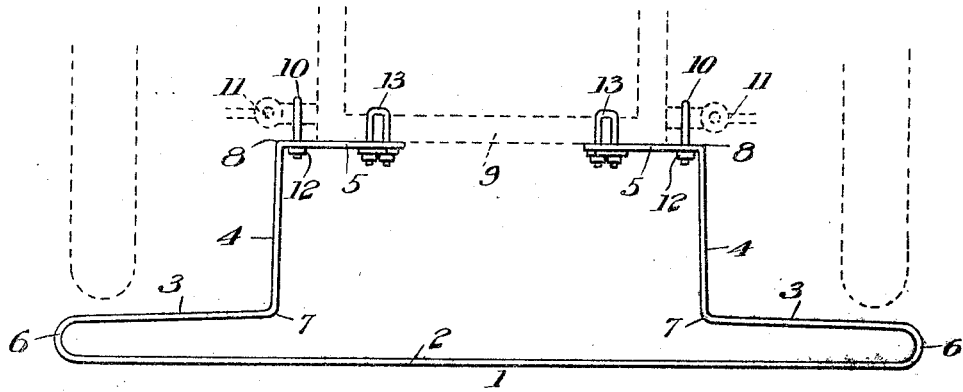
Figure 1 is a plan view of my bumper as applied to the front end of an automobile.
Figure 2:
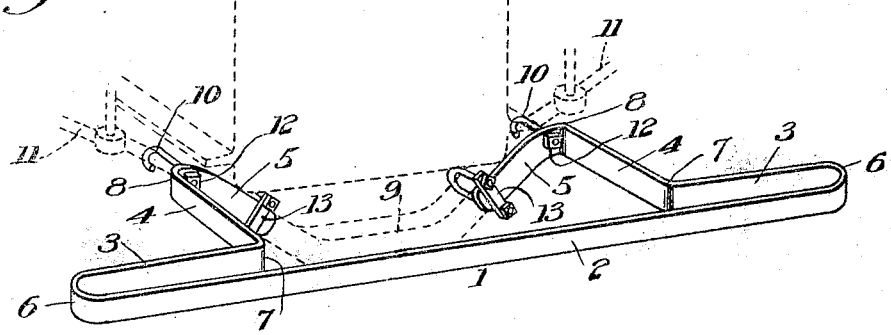
Figure 2 is a perspective view of my bumper as shown in Figure 1.

My bumper is made of a single bar 1 of spring steel, and comprises an impact-receiving member 2, connecting members 3—3 thrust members 4—4, and securing members 5—5. The connecting members 3—3 connect the ends of the impact-receiving member 2 and the forward ends of the thrust members 4—4, and are formed by bending the bar 1 at 6—6 at the ends of the impact-receiving member inwardly, nearly parallel to said member at a short distance from the inside thereof, so that the connecting members extend at a slightly acute angle to the impact-receiving members. The thrust members 4—4 are formed by bending the bar inwardly at 7—7 from the inner ends of the connecting members 3—3 at obtuse angles to said connecting members. The thrust members 4—4 of the front bumper shown in Figs. 1 and 2 extend at only slightly obtuse angles, or nearly at right angles to the connecting members 3—3 and impact-receiving member 2 to resist great shock thereto, but they diverge slightly from the front end of the automobile chassis so that they may respectively yield outwardly slightly from the securing members 5—5 when blows are received by the impact-receiving member 2 near or at one end or the other thereof. The securings members 5—5 of the front bumper are bent inwardly at 8—8 from the rear ends of said thrust members substantially at right angles to said thrust members and downwardly at angles therefrom, so that they may fit against the end portions of the front end member 9 of an automobile chassis such as the "Ford" automobile chassis, which end member is bent downwardly from its ends to form the saddle for the front spring of the automobile. The securing members 5—5 are apertured near their junctures with the thrust members 4—4 to receive the forward ends of hook bolts 10—10, which hook over the front lamp brackets 11—11 extending outwardly from the sides of the chassis at the front end thereof. Nuts 12—12 screw on the front ends of said hook bolts against the securing members 5—5. U-bolt clamps 13—13 extend over the front end chassis member 9 and over the securing members 5—5, whereby said securing members are clamped against said chassis member. The hook bolts 10—10 and clamps 13—13 detachably secure the bumper directly on the front end of the automobile.

The impact spring action of the impact-receiving member 2 is limited by the engagement of said member with the connecting members 3—3 at the points 7—7, whereupon the thrust of the impact is resisted directly by the thrust members 4—4. The thrust members of both the front and the rear bumpers yield outwardly respectively from the points 8—8 when the impact-receiving member 2 receives a shock near one end or the other.

It is obvious that may changes and variations and modifications may be made in departure from the particular description and showing of the accompanying drawing, in adapting the invention to varying condition and requirements of use and service, without departing from the true spirit of the invention.

Having thus disclosed my invention, I claim and desire to secure by Letters Patent:

A one piece bumper formed with securing members, clamps for clamping said securing members against the end member of the automobile chassis, hook bolts for engaging the automobile lamp brackets and extending through said securing members, and nuts screwing on the ends of said bolts against said securing members.

In testimony whereof, I have signed my name to this specification.

JAMES B. L. BROWN.